Feb. 12, 1963

C. K. BRAUN 3,077,259

TRANSFER DEVICE

Filed April 27, 1962

INVENTOR.
CARL K. BRAUN
BY
Burton & Parker
ATTORNEYS

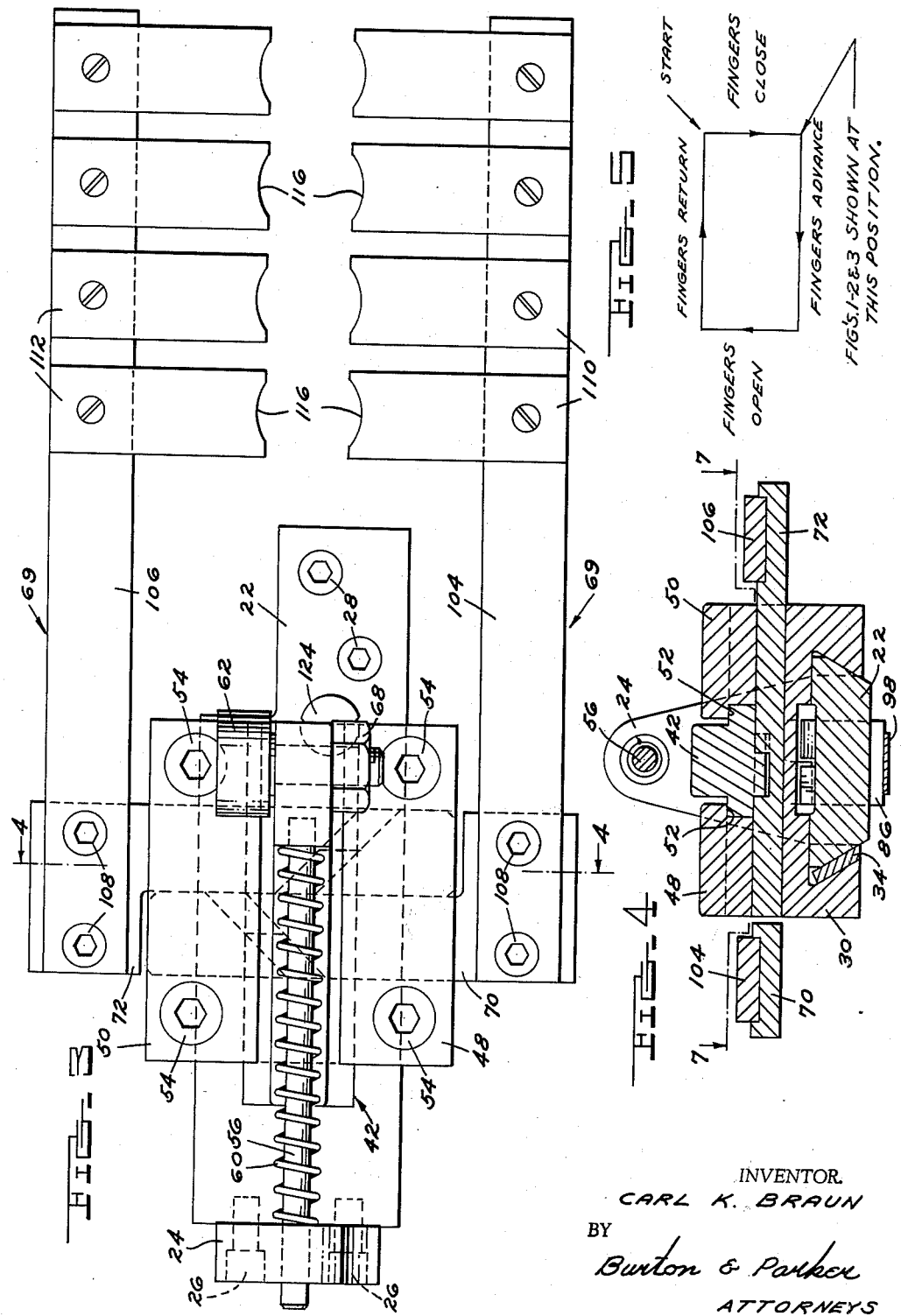

Feb. 12, 1963

C. K. BRAUN 3,077,259

TRANSFER DEVICE

Filed April 27, 1962

INVENTOR.
CARL K. BRAUN
BY
Burton & Parker
ATTORNEYS

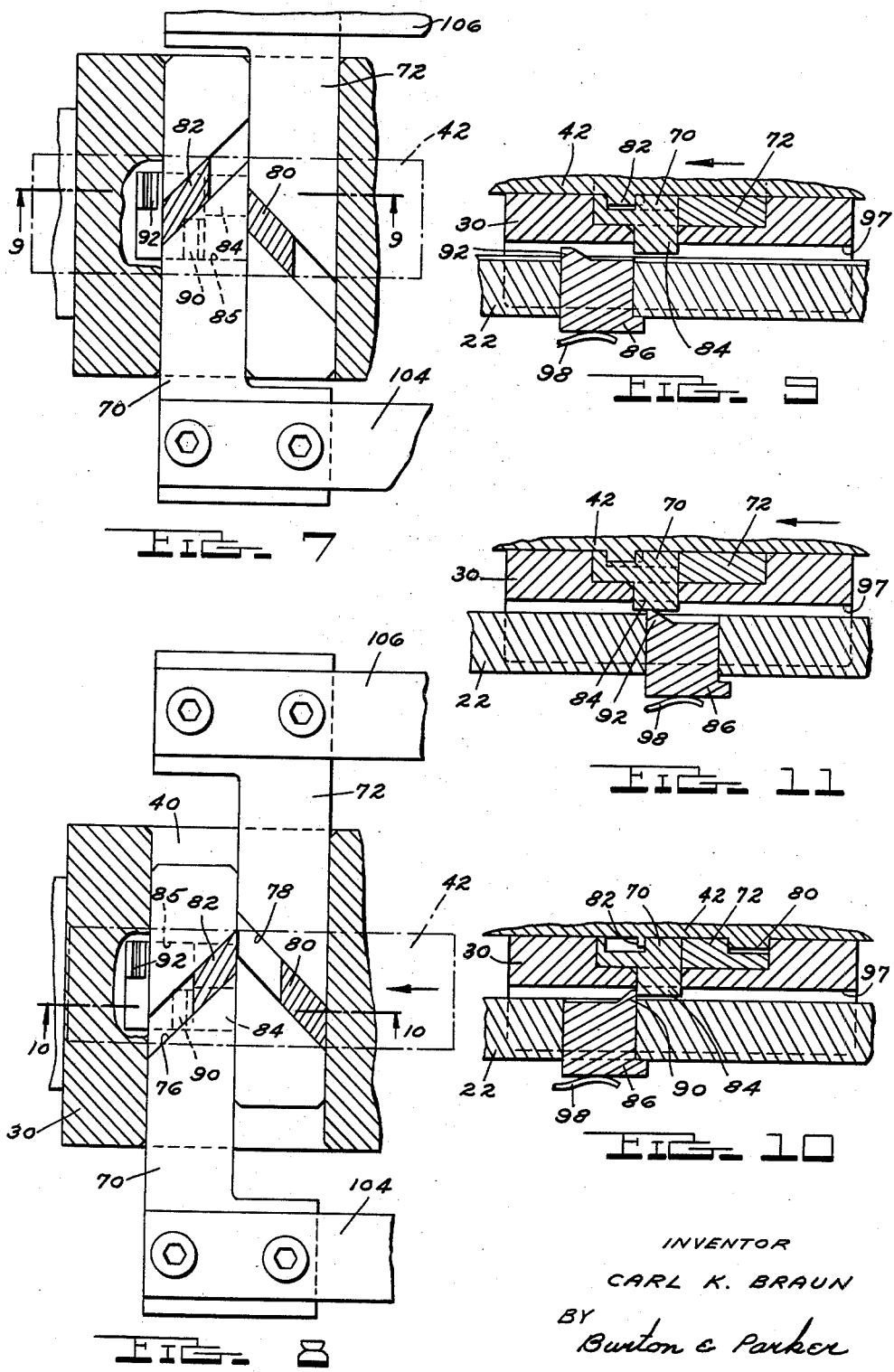

United States Patent Office 3,077,259
Patented Feb. 12, 1963

3,077,259
TRANSFER DEVICE
Carl K. Braun, Royal Oak, Mich., assignor to Skill Tool, Inc., Warren, Mich., a corporation of Michigan
Filed Apr. 27, 1962, Ser. No. 190,655
11 Claims. (Cl. 198—218)

This invention relates to transfer devices, and in particular to a device for transferring individual articles in a step-by-step linear movement, whereby one or several articles may be transferred simultaneously.

The device embodying the invention is particularly designed to be used for feeding small articles or pieces of material into the die of a punch press and/or transferring such articles out of the press after the forming operation has been performed.

It is therefore a general object of the invention to provide a transfer device of simple and rugged construction which is operable to transfer articles or pieces of material in a step-by-step linear movement.

Another object of the invention is the provision of a transfer device comprising a pair of finger assemblies disposed in confronting relation and shiftable through a cycle of movement whereby articles will first be picked up by movement of the assemblies toward each other, next articles will be transferred by conjoint linear movement of the assemblies, third articles will be released by movement of the assemblies away from each other, and last the assemblies will move to their original position ready to repeat the transfer cycle.

A further object of the invention is the provision of a transfer device capable of transferring individual articles in a step-by-step linear movement, which device is comparatively small and compact, and which may be easily and conveniently mounted on the frame of a punch press or like machine to transfer articles to and from such machine in timed sequence to the operating cycle of the machine.

Another object of the invention is the provision of a transfer device for use in feeding articles to a punch press or like machine, which device may be operated in timed sequence to machine operation by engagement with a reciprocating portion of the machine. It is a concomitant object to provide such a transfer device which may be cyclically operated by an external power source, such as a hydraulic or electric system.

Other objects, advantages and meritorious features will more fully appear from the following description, claims and attached drawings, wherein:

FIG. 3 is a top elevation of the transfer device shown in FIG. 1;

FIG. 4 is a cross-sectional view taken along line 4—4 of FIG. 3;

FIG. 5 is a schematic diagram of the cycle of operation of the transfer device, indicating the motion of the transfer fingers;

FIG. 7 is a view, partly in cross-section, taken along line 7—7 of FIG. 4, showing the slide members in closed position;

FIG. 8 is a view similar to FIG. 7 showing the slide members in open position;

FIG. 9 is a cross-sectional view taken along line 9—9 of FIG. 7;

FIG. 10 is a cross-sectional view taken along line 10—10 of FIG. 8; and

FIG. 11 is a cross-sectional view similar to FIGS. 9 and 10 showing the relationship of certain parts of the device during the work feeding portion of the operating cycle.

Figure 6:
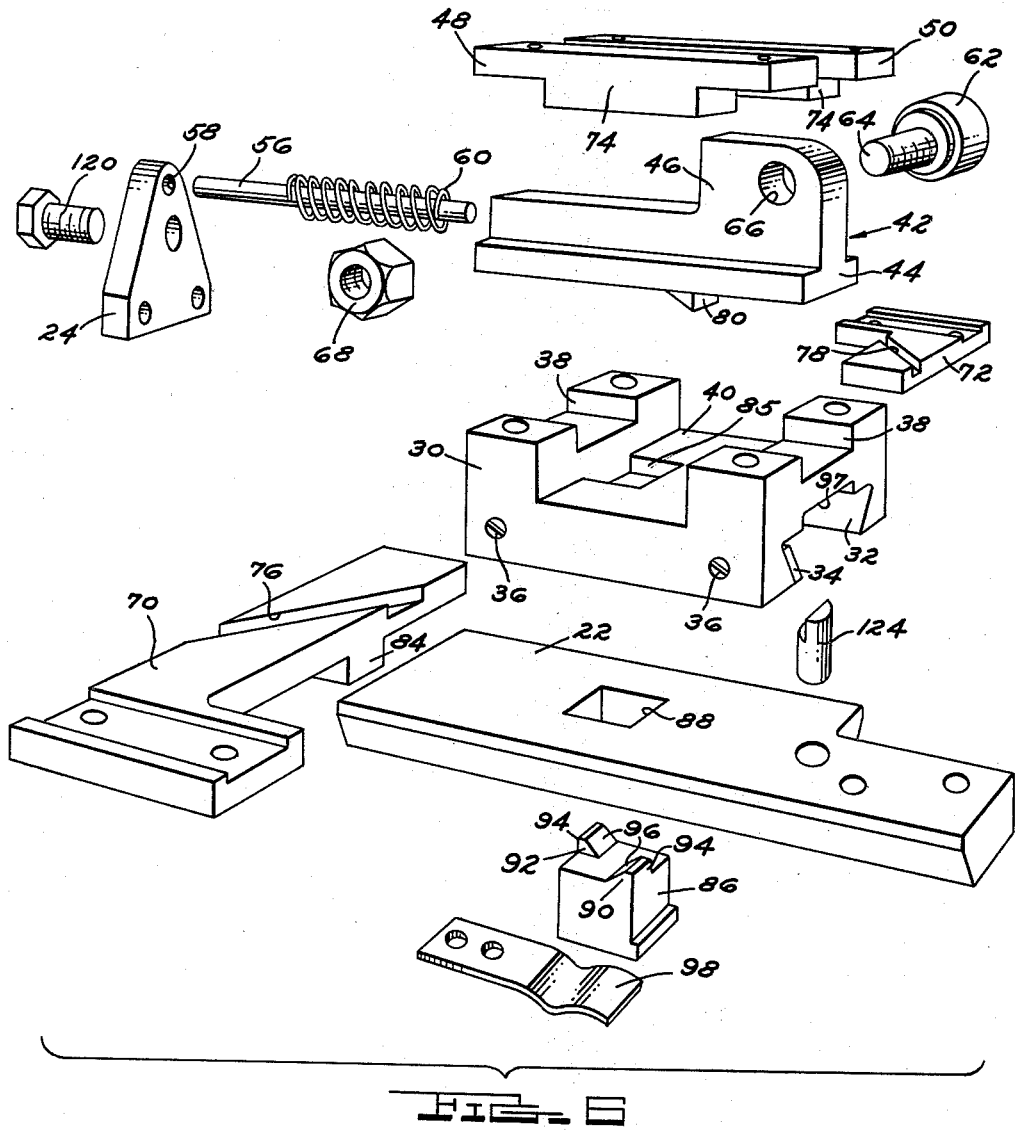
FIG. 6 is an exploded perspective view of the transfer device of FIGS. 1–3, showing the physical relationship of each of the parts.

Referring now to the drawings, it can be seen that there is shown therein a transfer device adapted to move small articles or pieces of material in a step-by-step linear motion. Such a device is particularly adapted to feed successive small parts to a machine such as a punch press or the like. The transfer device comprises a stationary base 20 which includes a horizontal tongue portion 22 and a vertical end plate 24 suitably secured together as by screws or the like 26. The base 20 may be mounted on a stationary portion of the machine (not shown) as by bolts 28 (FIGS. 2 and 3) extending through tongue 22 or in any other convenient fashion. The device could of course be mounted on a separate stand depending on the particular application for which it is to be used. Mounted slidably upon the tongue 22 is a main slide 30 having a groove 32 in the bottom surface thereof shaped to conform to the contour of the tongue. As shown in FIG. 4, the tongue and groove are preferably of generally keystone shape in cross-section, preventing relative vertical movement between the tongue 22 and main slide 30. The assure proper alignment of the bearing surfaces between the tongue 22 and main slide 30, there may be provided a bearing plate 34 interposed between mating surfaces of the two members, and held in position in the housing groove by screws 36 (FIG. 6).

As shown most clearly in FIG. 6, the upper surface of main slide 30 opposite the groove 32, is machined to provide a pair of aligned slots or guideways 38 within which a slide may be disposed for shiftable movement, as hereinafter described. Another machined slot or guideway generally indicated by numeral 40 is provided, defining a bearing surface spaced vertically below the surface of slots 38, for purposes which will likewise appear more fully hereinafter. Slots 38 are disposed in horizontally perpendicular relation with slot 40, as shown.

Figure 1:
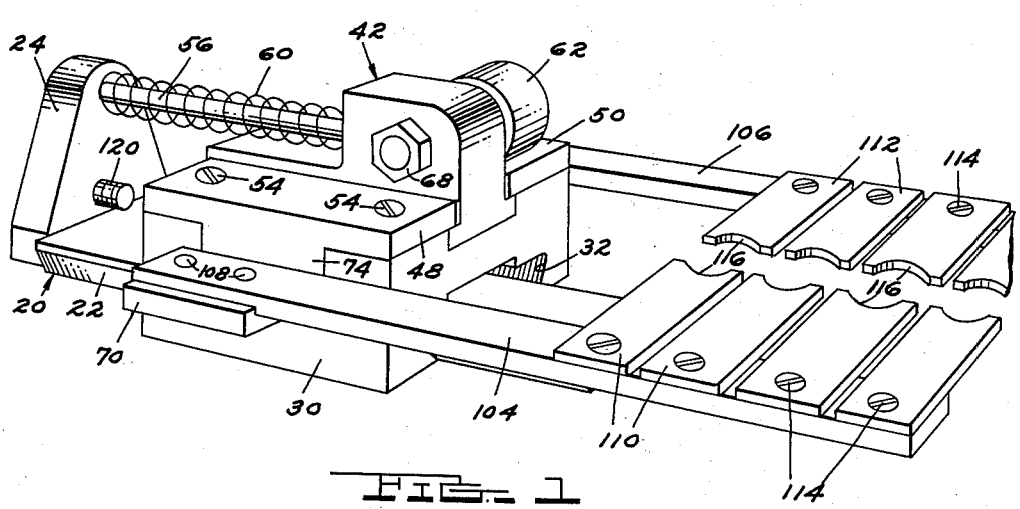
FIG. 1 is a perspective view of a transfer device embodying my invention.

Disposing in sliding engagement within the slots 38 is a drive slide 42, which is of inverted T-shape in vertical cross-section, with the base 44 of the T adapted to slide within the slots 38, and the leg 46 of the T extending upwardly from the housing 30. The drive slide 42 is held positioned in the main slide 30 by a pair of gibs or the like 48 and 50. Each gib 48 and 50 has an inwardly projecting shoulder 52 which overlies the upper surface of the drive slide base 44 (FIG. 4) to maintain the slide in position. The gibs are secured to the main slide 30 by means of screws or the like 54, as shown in FIG. 1. Thus drive slide 42 is free to slide horizontally back and forth within slots 38, but is held against vertical movement by the walls of the slots and the gibs 48 and 50. A rod 56 is provided, having one end threaded into the leg 46 of the drive slide 42, and having its opposite end projecting slidably through an aperture 58 in end plate 24. Surrounding rod 56 between drive slide 42 and end plate 24 is a coil spring 60 which serves to bias the slide away from the end plate. A roller 62 rotatably mounted on a shaft 64 is provided, which shaft extends through a suitable aperture 66 in drive slide 42, and is held therein by threaded engagement with a nut 68. The purpose and function of these elements will become apparent as the specification proceeds.

Indicated generally by the numeral 69 in FIGS. 1 and 3 are a pair of finger assemblies. One such assembly comprises a cross slide 70, rail 104, and a plurality of fingers 110. The opposite assembly comprises cross slide 70, rail 106, and fingers 112. Within the slot 40 in the main slide 30 are disposed the pair of similarly shaped cross slides 70 and 72 which are of L-shaped configuration, and which are retained between the bearing surfaces of the slot 40 and the gibs 48 and 50. To permit slidable movement and simultaneously hold the slides 70 and 72 against vertical movement, each gib has a downwardly extending portion 74 projecting within the slot 40 to prevent vertical movemet of the cross slides. The cross slides 70 and 72 underlie the base 44 of drive slide 42, permitting relative movement between the drive slide and the cross slides. Each cross slide is provided with an upwardly opening channel in its upper surface indicated by the numerals 76 and 78, which channels extend diagonally across their respective slides, as shown in FIGS. 6, 7 and 8. The channels are inclined in opposite directions in the slides to attain the desired cooperating motion between the cross slides. Thus, the cross slides 70 and 72 will be shifted conjointly toward and away from each other by the movement of the drive slide 42, as will more fully appear. Projecting from the bottom surface of the drive slide 42 are a pair of integral lands 80 and 82, which are positioned so as to slidably engage respective channels 76 and 78 in cross slides 70 and 72. One such land 80 is visible in FIG. 6, and both blocks are shown in cross-section in FIGS. 7 and 8. The blocks are inclined diagonally with respect to the longitudinal center line of main slide 30 so as to lie within the respective channels 76 and 78. Each block 80 and 82 is shorter than the channel within which it is disposed, so that the blocks may shift in the channels back and forth from the position shown in FIG. 7 to the position shown in FIG. 8. Hence, with the main slide 30 held stationary, longitudinal movement of the drive slide 42 will impart transverse movement to the cross slides 70 and 72 by the action of the lands 80 and 82 sliding within channels 76 and 78 of the cross slides.

One of the cross slides 70 or 72 is provided with a depending block 84. In the drawings the block 84 is shown on slide 70, but it will be apparent to one skilled in the art that it could with equal advantage be on slide 72 if so desired. Block 84 extends downwardly through a suitable aperture 85 in main slide 30 and serves to prevent longitudinal shifting of main slide 30 and cross slides 70 and 72 until the cross slides have completed their transverse movement, as will more fully appear. Cooperating with block 84 is a dog 86 which projects upwardly through an aperture 88 in tongue 22 into interfering relation with block 84 under certain conditions. Dog 86 has a pair of ears 90 and 92 projecting upwardly from diagonally opposite corners of the dog. Each ear has a vertical face 94 and an inclined face 96 positioned to allow block 84 to pass over the respective ear in one direction but prevent movement in the opposite direction. Main slide 30 is provided with a longitudinal cut-out 97 therein to accommodate block 84 and the ears 90 and 92, as shown most clearly in FIGS. 9–11 inclusive. Dog 86 is yieldingly biased upwardly within aperture 88 by a spring 98 suitably secured to the underside of tongue 22 as by screws 100. A shoulder 102 near the lower edge of the dog 86 limits its upward travel within the aperture 88 in tongue 22. As can be seen from the drawings, main slide 30 is capable of reciprocable movement longitudinally along tongue 22. Cross slides 70 and 72 are capable of shiftable movement transversely of main slide 30 while the main slide is held against movement. This transverse movement of the cross slides shifts the fingers 116 toward and away from each other to engage and release articles disposed between confronting pairs of fingers. In addition, drive slide 42 is capable of longitudinal reciprocable movement in the direction of movement of the main slide 30, both conjointly with and relative to the main slide. The interaction of the various elements and correlation of their movements will be more fully described hereinafter.

Projecting from the respective cross slides 70 and 72 and extending therefrom in spaced parallel relation, are a pair of rails 104 and 106 secured at one end to the slides as by screws 108, and having at their opposite end a plurality of confronting pairs of fingers 110 and 112. Each finger is suitably secured to its rail as by screws 114, and each has an inner end shaped as at 116 to define a gripping portion for engaging the part (not shown) to be transferred. Obviously the inner ends 116 of the fingers could be shaped to suitably engage articles of any configuration which it is desired to transfer.

Figure 2:
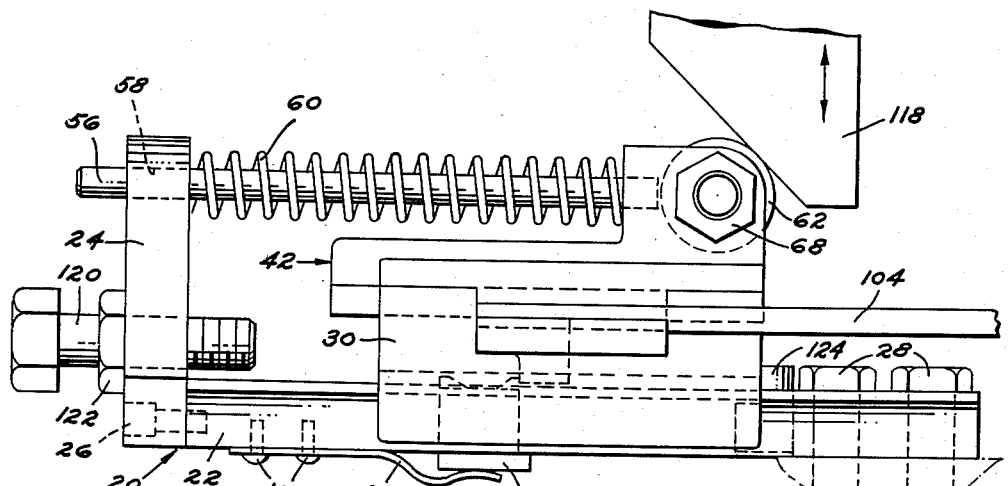
FIG. 2 is a side elevation of the transfer device shown in FIG. 1.

The transfer device embodying my invention shown in the drawings is particularly well adapted to be used for feeding individual workpieces into and/or out of a machine such as a punch press or the like. To correctly feed workpieces into a punch press, some means must be provided for driving the transfer device and for synchronizing movement of the workpieces with the operating cycle of the machine being fed. To accomplish this, various systems may be employed. For example, the transfer device could be driven by a fluid pressure operated cylinder controlled by suitable valves to establish an operating cycle synchronized with the machine. As an alternate construction, the transfer device could be operated electrically. Referring first to FIG. 2, there is shown a simple means for operating the transfer device mechanically in synchronism with the machine to which workpieces are to be transferred. To accomplish this, a cam 118 is provided which is rigidly secured to a reciprocating part of the machine, such as the upper die of a punch press for instance (not shown). Briefly, as the cam 118 reciprocates, it engages the roller 62, which in turn shifts the drive slide back and forth to operate the remainder of the moving parts of the transfer device. Cam 118 moves up and down as indicated by the arrow in FIG. 2. The employment of cam 118 for driving the device results in a simple mechanical drive which is automatically synchronized with the machine being fed, obviating the need for complicated timing devices, valves, etc.

As can be seen from FIG. 5, the cycle of operation can be broken down into four steps. First the pairs of fingers 110 and 112 shift toward each other or close to engage the parts to be transferred; next, the fingers are advanced to move the parts a predetermined distance; third, the fingers shift away from each other or open to release the transferred parts; and fourth, the fingers return to their starting point to repeat the cycle. It should be noted at this point that FIGS. 1, 2 and 3 are shown at the position indicated in FIG. 5, that is, at the end of the first step of the operating cycle. In this position the fingers are closed and ready to advance.

The operation of the transfer device as indicated by the various figures in the drawings will now be described, with particular reference to FIGS. 7–11 inclusive, which are cross-sectional views showing the relative position of specific portions of the device at various points during its operating cycle. With the device in "start" or normal position, the various parts are in relative positions with respect to each other as indicated in FIGS. 8 and 10. The cross slides are then in their extended positions, and the block 84 depending from cross slide 70 is engaged by the vertical face of ear 90 on dog 86 (FIG. 10). The lands 80 and 82 on drive slide 42 (the outline of which slide is shown in phantom outline in FIG. 8) are disposed in the respective slots 78 and 76 in the cross slides. As cam 118 (FIG. 2) shifts downwardly, it contacts roller 62 carried by drive slide 42, and causes the slide to move against the tension of coil spring 60 to the left as shown in FIG. 2. Referring back to FIGS. 8 and 10, it can be seen that the cross slides 70 and 72, and main slide 30 are held against longitudinal movement to the left of the drawings by block 84 on slide 70 being locked over ear 90 on dog 86. Thus during the initial portion of the stroke of drive slide 42, the lands 80 and 82 depending therefrom are shifted within the cross slide channels 78 and 76. This relative movement between drive slide 42 and cross slides 70 and 72 shifts the cross slides toward each other, carrying rails 104 and 106 and fingers 110 and 112 to their "closed" position.

During the inward movement of cross slide 70 toward cross slide 72, its depending block 84 slides across ear 90 on dog 86 in a direction perpendicular to the direction of movement of drive slide 42. As soon as block 84 shifts past ear 90, the cross slides 70 and 72 are free to shift with drive slide 42 in the direction of the arrow in FIG. 8. As block 84 projects through aperture 85 in main slide 30, the main slide is held against longitudinal movement until block 84 shifts past ear 90 on dog 86. At this point in the operating cycle, the device is in the position shown in FIGS. 7 and 9. Thus drive slide 42 has shifted longitudinally through an initial portion of its stroke, and cross slides 70 and 72 have shifted transversely relative to main slide 30 and drive slide 42 to shift fingers 110 and 112 toward each other, gripping a part to be advanced between each pair of fingers.

As can be seen from FIGS. 7 and 9, when the fingers have been shifted to closed position by the movement of cross slides 70 and 72 toward each other, block 84 has been shifted away from ear 90 and is free to slide along the surface of dog 86 adjacent such ear. The roller 62 and cam 118 are now in the positions shown in FIG. 2. As the cam continues its downward movement, drive slide 42 is shifted further in the direction of the arrow shown in FIG. 10. However, during this portion of the cam travel, main slide 30 and cross slides 70 and 72 are free to shift with drive slide 42, as are the rails 104 and 106, and the fingers 110 and 112. Thus the articles or workpieces engaged between each confronting pair of fingers 110 and 112 are advanced. As shown most clearly in FIG. 2, a bolt 120 threaded through plate 24 and provided with a lock nut 122 serves to abut main slide 30 at one end of its stroke, limiting the travel of the assembly in one direction. The travel of the main slide is limited in the other direction by a post 124 projecting from tongue 22 in the manner shown in FIG. 2.

Referring now particularly to FIG. 11, during the conjoint advance of main slide 30, drive slide 42 and cross slides 70 and 72, the block 84 depending from cross slide 70 passes over the ear 92 on dog 86. The provision of the inclined face 96 on ear 92 (FIG. 6) enables the block 84 to pass over the ear, the dog 86 being urged downwardly against the yielding spring 98 to permit such movement. After block 84 has passed completely over ear 92, dog 86 is free to return to its upper position under the urging of spring 98, and the block 84 becomes locked against reverse travel by engagement with the vertical face 94 of ear 92. In this position, the roller 62 has passed over the inclined edge of cam 118, and any further downward movement of the cam will not further shift drive slide 44.

When cam 118 begins its upward stroke, roller 62 again contacts the inclined cam edge, and drive slide 42 begins its reverse travel under the biasing action of spring 60. As this occurs, block 84 is locked behind ear 92 on dog 86, preventing cross slides 70 and 72 from moving with the drive slide 42. Thus the drive blocks 80 and 82 shift within the channels 78 and 76, respectively, and the cross slides are thereby shifted outwardly away from each other. When slide 70 has shifted a sufficient distance outwardly to allow block 84 to clear ear 92, cross slides 70 and 72 and main slide 30 are free to move conjointly with drive slide 42, and thus during the remainder of the forward stroke of the drive slide 42, the fingers are returned to their original open, retracted position, ready to begin a new cycle of operation.

It is obvious, of course, that the drive slide 42 could be reciprocated by means other than the cam 118, as by an electric or hydraulic motor. Reciprocation of the drive slide by any suitable means will cause the transfer device to operate in the manner set forth hereinabove.

Thus it can be seen that during a complete cycle of operation, each pair of fingers are first shifted to a closed position to engage a part for transfer, then the fingers are advanced to transfer such part through a predetermined distance, next the fingers are shifted to an open position to release the part, and last the fingers are retracted to their original position to repeat the cycle of operation. It is apparent that any number of pairs of fingers could be used, depending on the particular operating characteristics desired.

What is claimed is:

1. A device for transferring articles comprising, in combination: a base; a slide supported on the base for reciprocable movement therealong; a pair of article engaging finger assemblies carried by said slide for movement therewith, said assemblies being shiftable relative to said slide toward and away from each other in a direction generally perpendicular to the movement of said slide; means coupled with said finger assemblies and reciprocable relative to the slide in the direction of slide movement during an initial portion of means stroke and to shift conjointly with said slide during the remaining portion of such stroke; said fingers responsive to relative movement between said means and said slide to be shifted laterally toward and away from each other during such relative movement; and locking means coupled to said base and said slide normally holding the slide against movement and responsive to lateral shifting of said fingers to release said slide for longitudinal movement conjointly with said means.

2. A device for transferring articles comprising, in combination: a base; a main slide supported upon the base for reciprocable linear movement therealong; a pair of article engaging finger assemblies carried by the main slide for linear movement therewith, at least one of said finger assemblies being supported upon the main slide for shiftable movement relative thereto toward and away from the other finger assembly and in the direction generally perpendicular to the linear movement of such slide; a drive slide mounted upon the main slide for movement therewith and for relative movement with respect thereto in the same direction as the main slide; driving means coupled with the drive slide to actuate the same in the direction of movement of the main slide; said drive slide coupled with a shiftable finger assembly to shift the assembly relative to the main slide and generally perpendicular with respect to the linear movement of the main slide while the main slide is held against linear movement; and locking means operable to hold the main slide against linear movement during the initial stage of movement of the drive slide in response to said driving means.

3. A device for transferring articles comprising, in combination: a base; a main slide mounted on the base for reciprocable linear movement therealong; a pair of article engaging finger assemblies carried by said main slide for linear movement therewith and supported on the main slide for movement relative thereto toward and away from each other in a direction generally perpendicular to the movement of the main slide; a drive slide mounted on the main slide for movement therewith and for relative movement with respect thereto in the same direction as the main slide; driving means coupled to the drive slide to actuate the same; said drive slide coupled to said finger assemblies to shift the latter toward and away from each other during shifting of the drive slide relative to the main slide with the main slide held against linear movement; and locking means coupled to said main slide and the base to hold the main slide against linear movement during the initial stage of movement of the drive slide in response to said driving means.

4. A device for transferring articles comprising, in combination: a stationary base; a main slide supported on the base for reciprocable movement therealong; a drive slide supported on the main slide for reciprocable movement parallel to the movement of said main slide, said drive slide being shiftable relative to said main slide during an initial portion of its stroke in either direction and shiftable conjointly with said main slide during the remaining portion of its stroke; a pair of finger assemblies carried by said main slide for movement therewith, said finger assemblies being shiftable relative to said main slide toward and away from each other in a direction perpendicular to the reciprocable movement of said slides; driving means coupled to said drive slide to shift the same, with said drive slide coupled to said finger assemblies to shift said finger assemblies toward each other during said initial portion of the stroke of said drive slide in one direction and away from each other during said initial portion of such stroke in the opposite direction; locking means coupled to said base and said main slide to hold such slide against movement during said initial portion of the stroke of said drive slide and responsive to the lateral shifting of said finger assemblies to release the main slide for conjoint reciprocation with the drive slide during the remaining portion of the stroke of the drive slide.

5. A device for transferring articles comprising, in combination: a stationary elongate base; a main slide supported on the base for reciprocable linear movement longitudinally therealong; a drive slide supported on said main slide for reciprocable movement in the direction of the movement of the main slide, with said drive slide shiftable relative to said main slide during an initial portion of its stroke in either direction and shiftable conjointly with said main slide during the remaining portion of its stroke; a pair of finger assemblies carried by said main slide for movement therewith; said finger assemblies being shiftable on said main slide transversely of said base toward and away from each other; driving means coupled to said drive slide to shift the slide; said drive slide coupled to said finger assemblies to shift the same toward each other during the initial portion of the stroke of the drive slide in one direction and shift the finger assemblies away from each other during the initial portion of said stroke in the opposite direction; and means on the drive slide adapted to abut said main slide at the end of said initial portion of the stroke of said drive slide in either direction to shift said slides conjointly thereafter to shift the finger assemblies longitudinally therewith; and locking means coupled to said base and said main slide to hold said main slide against movement during the initial portions of the stroke of said drive slide in either direction.

6. A device for transferring articles comprising, in combination: a base; a main slide supported on the base for reciprocable linear movement therealong; a pair of finger assemblies carried by the main slide for linear movement therewith and supported on the main slide for shiftable movement relative to the main slide perpendicular to the direction of movement of the main slide; a drive slide mounted on the main slide for movement therewith and for relative movement with respect thereto in the same direction as the main slide; driving means coupled to said drive slide to actuate the same in the direction of movement of the main slide; each finger assembly including a portion underlying the drive slide exhibiting a channel therealong adjacent the drive slide and extending generally diagonally to the direction of movement of the main slide; said drive slide having a pair of depending lands adapted to engage respective channels in the finger assemblies and impart lateral movement to the finger assemblies toward and away from each other in a direction perpendicular to the movement of the main slide during a portion of shiftable movement of the drive slide relative to the main slide in the same direction as the main slide while the latter is held against linear movement.

7. A device for transferring articles in a step-by-step linear movement, comprising, in combination: a stationary base; a main slide supported on the base for reciprocable linear movement therealong; a pair of article engaging finger assemblies carried by the main slide and shiftable therewith, said finger assemblies being supported on the main slide for reciprocable movement relative thereto toward and away from each other in the direction generally perpendicular to the linear movement of such slide; each of said assemblies exhibiting a plurality of gripping fingers arranged in spaced confrontation with fingers on the other assembly to grip articles for transfer movement between each confronting pair; a drive slide mounted on the main slide for reciprocable movement therewith and for relative movement with respect thereto in the same direction as the main slide; driving means coupled to said drive slide to reciprocate the same in the direction of movement of the main slide; said drive slide coupled with each finger assembly to shift the assemblies laterally toward each other and grip articles during an initial portion of the stroke of the drive slide in one direction and shift the assemblies laterally away from each other and release articles during an initial portion of the stroke of the drive slide in the other direction; said drive slide moving relative to the main slide during said initial portion of its stroke in either direction with the main slide held against movement; locking means operable to hold the main slide against linear movement during said initial portion of the stroke of the drive slide in either direction and responsive to the lateral shifting of said finger assemblies to release the main slide for conjoint movement with the drive slide during the remainder of the stroke of the drive slide in either direction; and means on the drive slide adapted to abut said main slide upon the lateral shifting of said finger assemblies toward or away from each other during relative movement between the drive slide and the main slide and thereafter urge said main slide to shift conjointly with said drive slide during the remainder of the stroke of the drive slide in response to said driving means.

8. A device for transferring articles in a step-by-step linear movement comprising, in combination: a stationary base; a main slide supported on the base for reciprocable linear movement therealong; a pair of cross slides carried by the main slide and shiftable therewith, said cross slides being laterally shiftable upon the main slide in a direction generally perpendicular to the linear movement of such main slide; a rail secured to each of said cross slides for movement therewith and extending therefrom longitudinally of said main slide on opposite sides thereof respectively; each rail having a plurality of transversely facing gripping fingers arranged in spaced relation therealong, with said fingers arranged in confronting pairs to grip an article between each pair; a drive slide mounted on said main slide for movement therewith or for movement relative thereto in the same direction as the main slide; driving means coupled to said drive slide to reciprocate the same; means coupling said drive slide to each of said cross slides to shift the cross slides and rails laterally toward each other and grip articles between said fingers during an initial portion of the stroke of the drive slide in one direction and to shift the rails away from each other and release said articles during an initial portion of the stroke of the drive slide in the other direction; locking means coupled to said base and said main slide to hold said main slide against movement during said initial portions of the stroke of said drive slide in either direction, and responsive to the lateral shifting of said rails to release the main slide for movement conjointly with said drive slide during the remaining portions of the stroke of the drive slide; said drive slide including a portion adapted to abut said main slide upon completion of said initial portions of the drive slide stroke and thereafter shift said main slide conjointly with the drive slide during said remaining portions of said stroke in response to said driving means.

9. The invention as defined in claim 7 characterized in that each of said cross slides exhibits a channel along one surface thereof extending obliquely to the direction of movement of the drive slide, and said means coupling the drive slide to the cross slides comprises a pair of lands adapted to engage said channels and shift therein to impart lateral movement to said cross slides during said initial portions of the stroke of the drive slide in response to said driving means.

10. A device for transferring articles comprising, in combination: a stationary base; a main slide supported on said base for longitudinal reciprocable movement therealong; a pair of arms carried by said slide for movement therewith and supported on the slide for laterally shiftable movement toward and away from each other relative to the slide in a direction normal to slide movement, each of said arms including an outer end portion extending respectively beyond said slide on opposite sides thereof; an elongate rail secured to the outer end portion of each arm and extending longitudinally of the main slide in spaced parallel relation; a plurality of laterally projecting fingers mounted in spaced apart relation on each arm and arranged thereon in confronting pairs to grip an article between each pair; said rails and fingers being shiftable with said arms to grip an article between each confronting pair of fingers upon movement of the arms toward each other and to release such article upon movement of the arms away from each other; a drive slide mounted on said main slide and coupled to the arms and reciprocable relative to the main slide in the direction of main slide movement during an initial portion of the drive slide stroke, and thereafter reciprocable conjointly with the main slide during the remainder of said stroke; said arms responsive to relative movement between said drive slide and said main slide to be shifted laterally toward and away from each other during such relative movement between the drive slide and the main slide; driving means coupled to the drive slide to shift the same; and locking means coupled to said base and the main slide to hold said main slide against movement during the initial portion of the stroke of said drive slide, and responsive to said lateral shifting of the arms to release the main slide for conjoint movement with said drive slide during the remainder of the stroke of the drive slide in response to said driving means, with the main slide carrying said arms for conjoint movement during the remainder of said stroke.

11. A device for transferring articles in a step-by-step linear movement to a machine having a reciprocating part comprising, in combination: a stationary base mounted on said machine; a main slide supported on the base for reciprocable linear movement therealong toward and away from said die; a pair of article engaging finger assemblies carried by said main slide for linear movement therewith, and supported on the main slide for shiftable movement relative thereto toward and away from each other in a direction generally perpendicular to the movement of the main slide; a drive slide mounted on the main slide for movement therewith or for relative movement with respect thereto in the same direction as the main slide; a roller mounted for rotation on said drive slide; a cam secured to said reciprocating part of said machine for movement therewith and adapted to abut said roller to shift the drive slide in timed relationship with said part of the machine; said drive slide coupled to said finger assemblies to shift the assemblies laterally relative to the main slide toward and away from each other while the main slide is held against movement; means on the drive slide adapted to abut said main slide and transmit movement to the latter upon the shifting of the finger assemblies toward or away from each other; and locking means holding the main slide against movement during the lateral shifting of said finger assemblies and responsive to such shifting of the finger assemblies to release the main slide for movement conjointly with the drive slide.

No references cited.